(12) United States Patent (10) Patent No.: US 12,570,458 B2

Dutch (45) Date of Patent: Mar. 10, 2026

(54) VACUUM CONTAINER ASSEMBLY AND METHOD OF USE

(71) Applicant: Josiah Pieter Dutch, Brookvale (AU)

(72) Inventor: Josiah Pieter Dutch, Brookvale (AU)

( * ) Notice: Subject to any disclaimer, the term of this patent is extended or adjusted under 35 U.S.C. 154(b) by 372 days.

(21) Appl. No.: 18/130,455

(22) Filed: Apr. 4, 2023

(65) Prior Publication Data

US 2024/0336420 A1 Oct. 10, 2024

(51) Int. Cl.
| | |
|---|---|
| *B65D 81/20* | (2006.01) |
| *A47J 47/10* | (2006.01) |
| *B65D 43/02* | (2006.01) |
| *B65D 51/16* | (2006.01) |
| *B65D 53/02* | (2006.01) |

(52) U.S. Cl.
CPC .......... *B65D 81/2038* (2013.01); *A47J 47/10* (2013.01); *B65D 43/0202* (2013.01); *B65D 51/1683* (2013.01); *B65D 53/02* (2013.01); *B65D 2543/00194* (2013.01); *B65D 2543/00509* (2013.01); *B65D 2543/00546* (2013.01); *B65D 2543/00564* (2013.01)

(58) Field of Classification Search
CPC ........... B65D 81/2007; B65D 81/2015; B65D 81/2038; B65D 53/04; B65D 2543/00564; A47J 47/10
See application file for complete search history.

(56) References Cited

U.S. PATENT DOCUMENTS

| | | | | |
|---|---|---|---|---|
| 1,336,367 | A * | 4/1920 | Martineau .......... | B65D 81/2038 |
| | | | | 215/233 |
| 2,046,923 | A * | 7/1936 | O'Neil .................... | B65D 39/04 |
| | | | | 220/362 |
| 4,408,694 | A | 10/1983 | Mueller | |
| 9,908,647 | B2 | 3/2018 | Ahn | |
| 11,884,471 | B1 * | 1/2024 | Sanders .................... | B65B 7/28 |
| 2010/0270304 | A1 * | 10/2010 | Chen .................. | B65D 51/1683 |
| | | | | 220/231 |
| 2011/0049159 | A1 | 3/2011 | Renda | |

(Continued)

FOREIGN PATENT DOCUMENTS

| | | |
|---|---|---|
| CN | 201097982 | 8/2008 |
| CN | 201161736 | 12/2008 |

(Continued)

OTHER PUBLICATIONS

English translation of KR20130027668 (Year: 2013).*

*Primary Examiner* — Don M Anderson

(57) ABSTRACT

A vacuum container assembly for storage of food includes a container, which comprises glass material, and a cover, which is sized complementarily to an open top of the container, through which food can be added to the container. The cover closes the open top upon positioning of the cover on an upper edge of a perimeter wall of the container with a gasket of the cover engaging the perimeter wall. The gasket is attached to a lower surface of a metal plate of the cover and extends circumferentially around the metal plate proximate to its perimeter edge. A valve, which is attached to and which extends through the metal plate, selectively allows passage of air through the metal plate. The valve fluidly couples the container to a vacuum generator to generate a partial pressure within the container, thereby sealingly engaging the gasket to the perimeter wall.

6 Claims, 10 Drawing Sheets

(56) References Cited

U.S. PATENT DOCUMENTS

| | | | |
|---|---|---|---|
| 2015/0060446 A1* | 3/2015 | Park | B65D 81/2038 |
| | | | 220/345.6 |
| 2015/0102035 A1* | 4/2015 | Tuan | A47J 47/10 |
| | | | 220/378 |
| 2016/0122096 A1* | 5/2016 | Marosi | F16J 13/02 |
| | | | 220/378 |
| 2022/0106100 A1* | 4/2022 | Clair | A23B 2/708 |

FOREIGN PATENT DOCUMENTS

| | | | |
|---|---|---|---|
| CN | 101939165 | | 5/2015 |
| CN | 204623928 | | 9/2015 |
| CN | 202021403808 | | 8/2021 |
| KR | 20130027668 | * | 3/2013 |
| WO | WO2010136307 | | 12/2010 |

* cited by examiner

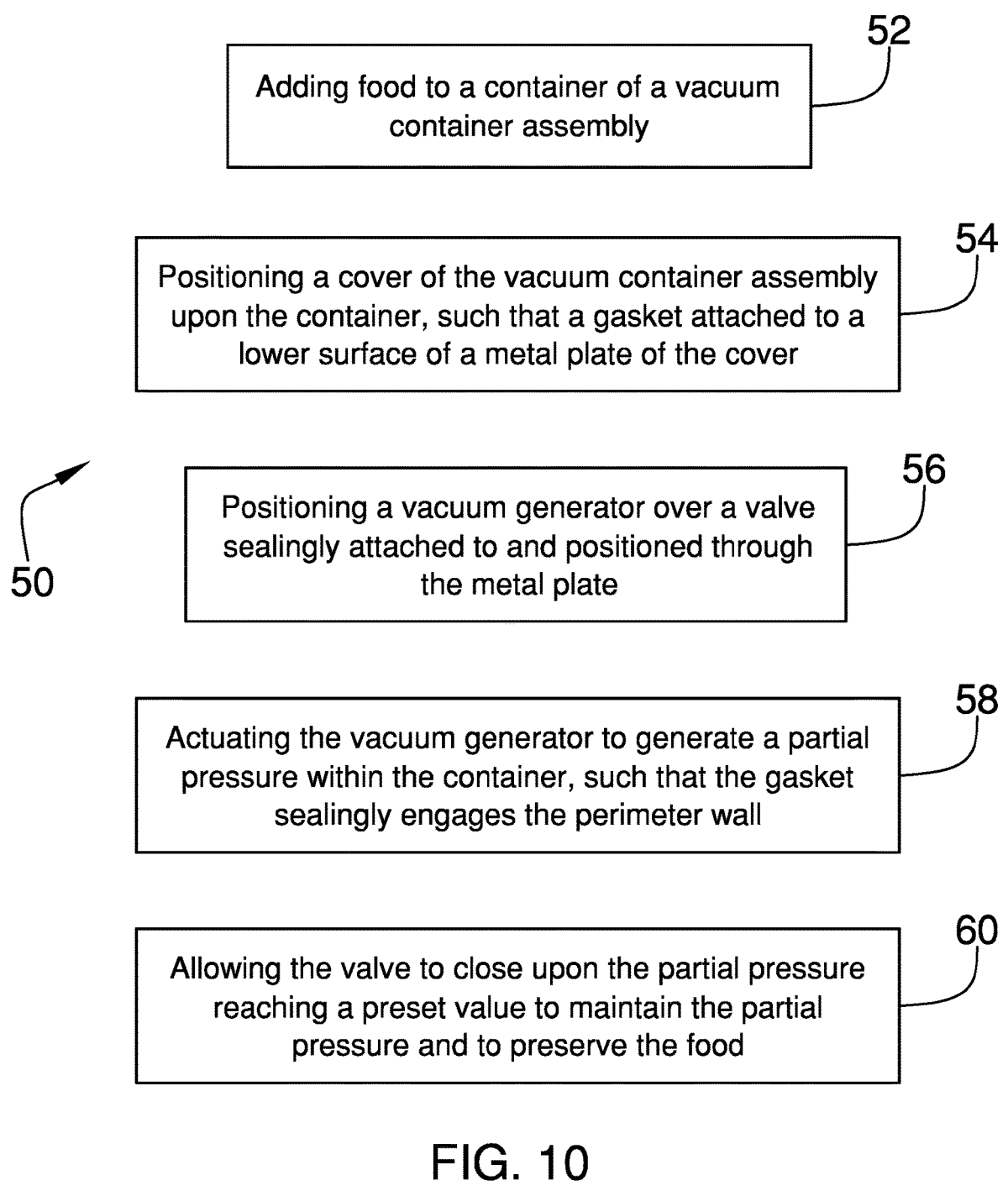

52

Adding food to a container of a vacuum container assembly

54

Positioning a cover of the vacuum container assembly upon the container, such that a gasket attached to a lower surface of a metal plate of the cover

56

Positioning a vacuum generator over a valve sealingly attached to and positioned through the metal plate

50

58

Actuating the vacuum generator to generate a partial pressure within the container, such that the gasket sealingly engages the perimeter wall

60

Allowing the valve to close upon the partial pressure reaching a preset value to maintain the partial pressure and to preserve the food

FIG. 10

VACUUM CONTAINER ASSEMBLY AND METHOD OF USE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION

(1) Field of the Invention.

The disclosure relates to vacuum containers and more particularly pertains to a new vacuum container for storage of food. The present invention discloses a vacuum container comprised of metal, glass, and silicone, and which thus is nonporous and substantially immune from deterioration leading to cracking and loss of vacuum.

(2) Description of Related Art including information disclosed under 37 CFR 1.97 and 1.98.

The prior art relates to vacuum containers, which generally are comprised, at least in part, of plastic and which thus suffer from the effects of deterioration, over time and with use, which lead to cracking and loss of vacuum.

BRIEF SUMMARY OF THE INVENTION

An embodiment of the disclosure meets the needs presented above by generally including a container, which comprises glass material and which has a bottom wall and a perimeter wall, with the latter being attached to and extending upwardly from the former. An upper edge of the perimeter wall defines an open top of the container, which has an interior space that is bounded by the perimeter wall and which is configured to receive food.

A cover, which has a size that is complementarily to the open top, closes the open top upon positioning of the cover on the upper edge of the perimeter wall. The cover comprises a metal plate, a gasket, and a valve. The gasket is attached to a lower surface of the metal plate and extends circumferentially around the metal plate proximate to a perimeter edge of the metal plate. The gasket engages the perimeter wall upon positioning of the cover upon the container to form an air-tight seal between the metal plate and the perimeter wall. The valve is attached to and extends through the metal plate and selectively allows passage of air through the metal plate. The valve is configured to fluidly couple a vacuum generator to the interior space to generate a partial pressure within the container, thereby sealingly engaging the gasket to the perimeter wall.

Another embodiment of the disclosure includes a method of storing and preserving food. Steps of the method include adding food to a container, positioning a cover upon the container, positioning a vacuum generator over a valve, actuating the vacuum generator, and allowing the valve to close upon the partial pressure reaching a preset value to maintain the partial pressure and to preserve the food.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 10 is a flow diagram for a method of storing and preserving food utilizing an embodiment of the disclosure.

DETAILED DESCRIPTION OF THE INVENTION

Figure 1:
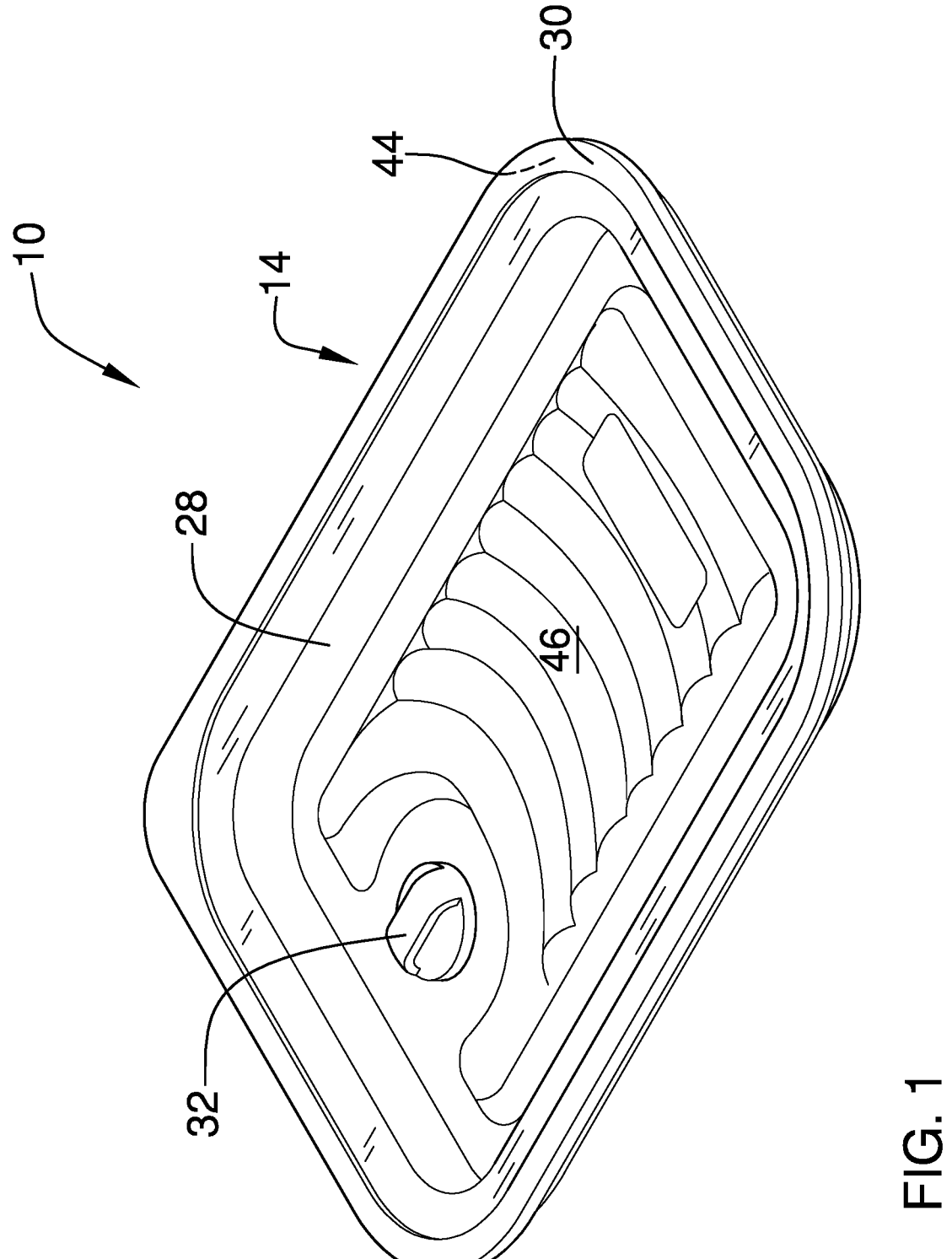
FIG. 1 is a top isometric perspective view of a vacuum container assembly according to an embodiment of the disclosure.

With reference now to the drawings, and in particular to FIGS. 1 through 11 thereof, a new vacuum container embodying the principles and concepts of an embodiment of the disclosure and generally designated by the reference numeral 10 will be described.

As best illustrated in FIGS. 1 through 10, the vacuum container assembly 110 generally comprises a container 12, which comprises glass material, and a cover 14. The container 12 typically will comprise borosilicate glass and thus be resistant to damage from thermal shock. The present invention anticipates the container 12 comprising other materials that are rigid, nonporous, and which, unlike plastics, do not become brittle and subject to cracking over time. Such materials include, for example, ceramics and metals.

Figure 9:
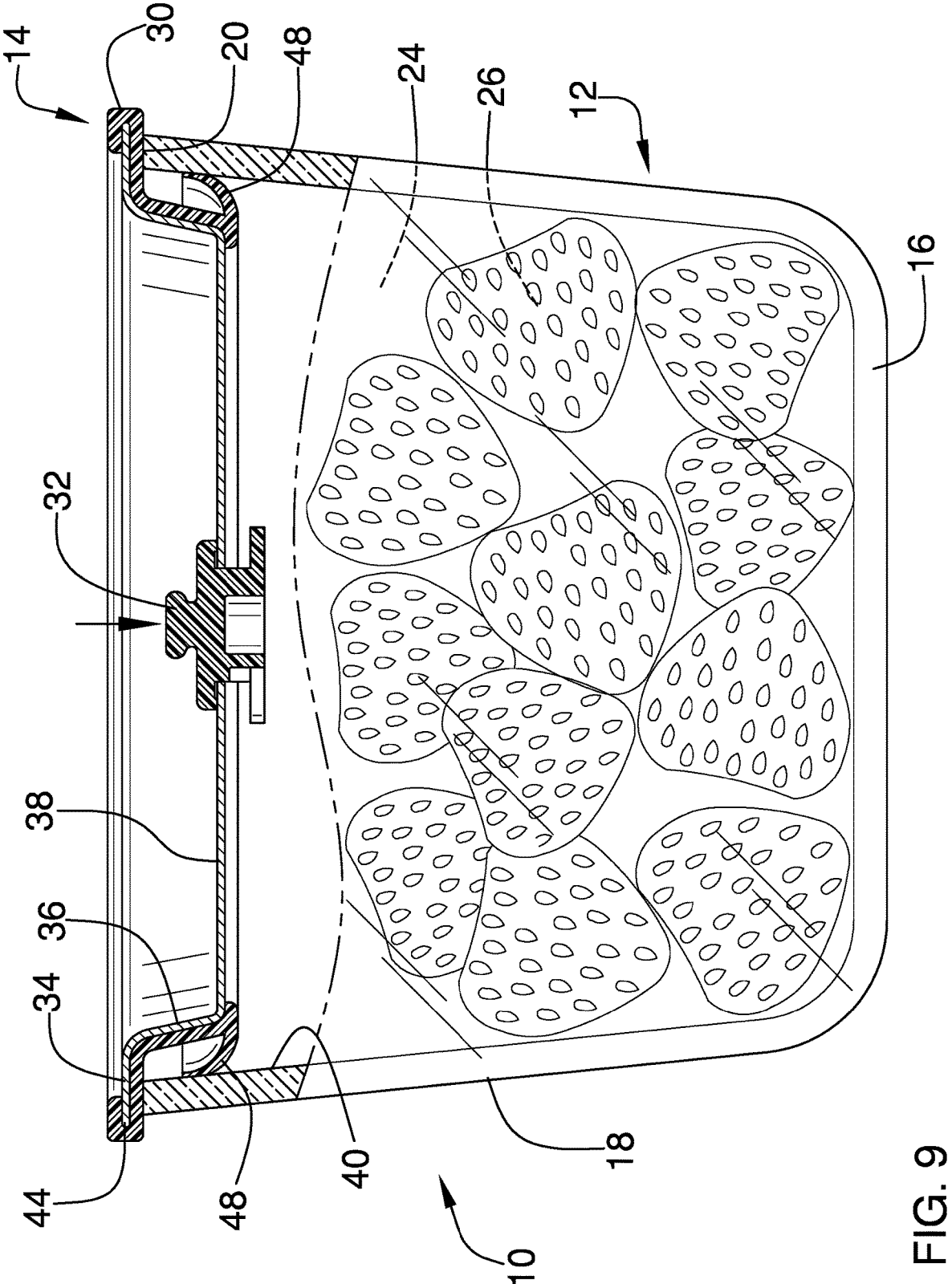
FIG. 9 is an in-use partial cross-sectional view of an embodiment of the disclosure.
Figure 11:
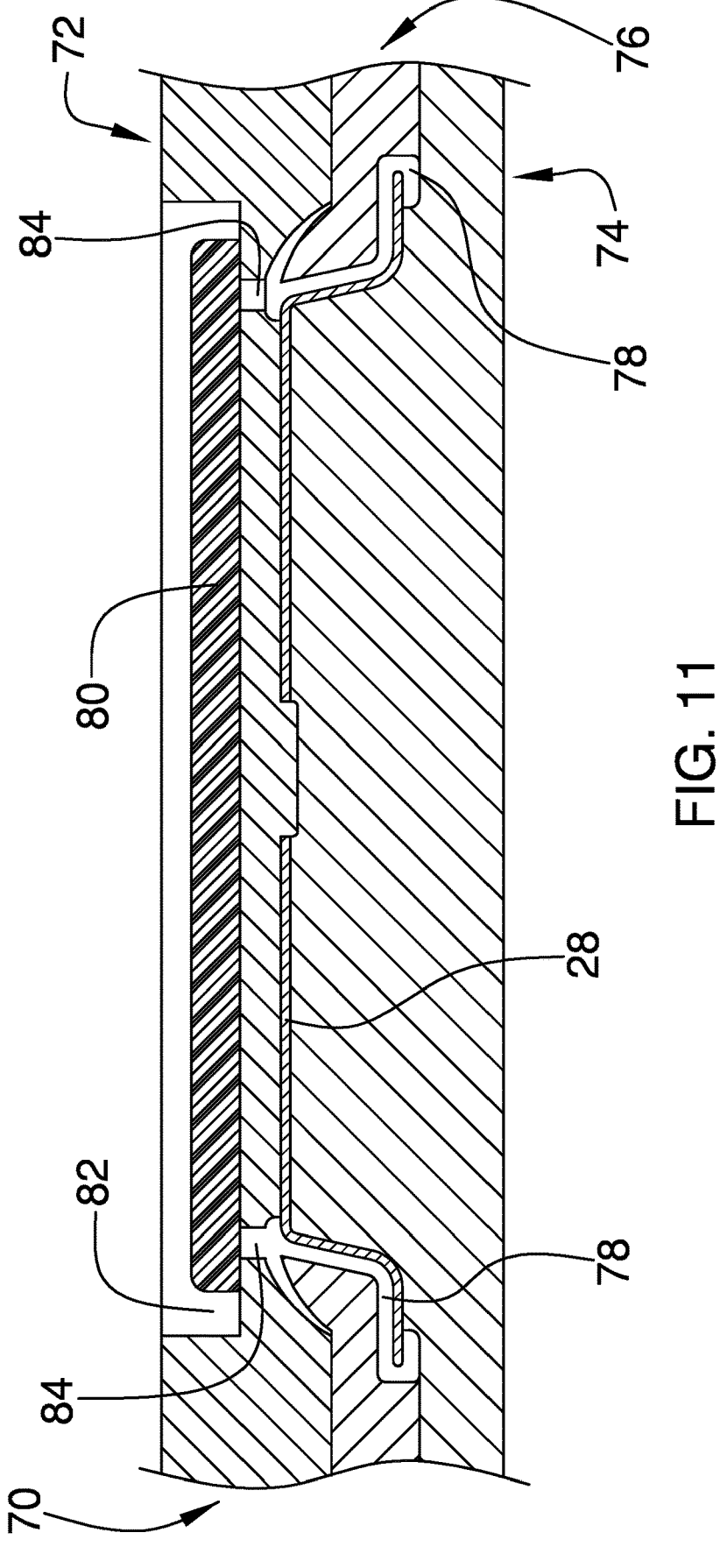
FIG. 11 is a cross-sectional view showing a mold for forming an embodiment of the disclosure.

The container 12 has a bottom wall 16 and a perimeter wall 18, with the latter being attached to and extending upwardly from the former. An upper edge 20 of the perimeter wall 18 defines an open top 22 of the container 12. The container 12 has an interior space 24 that is bounded by the perimeter wall 18 and which is configured to receive food 26, as is shown in FIG. 9.

Figure 3:
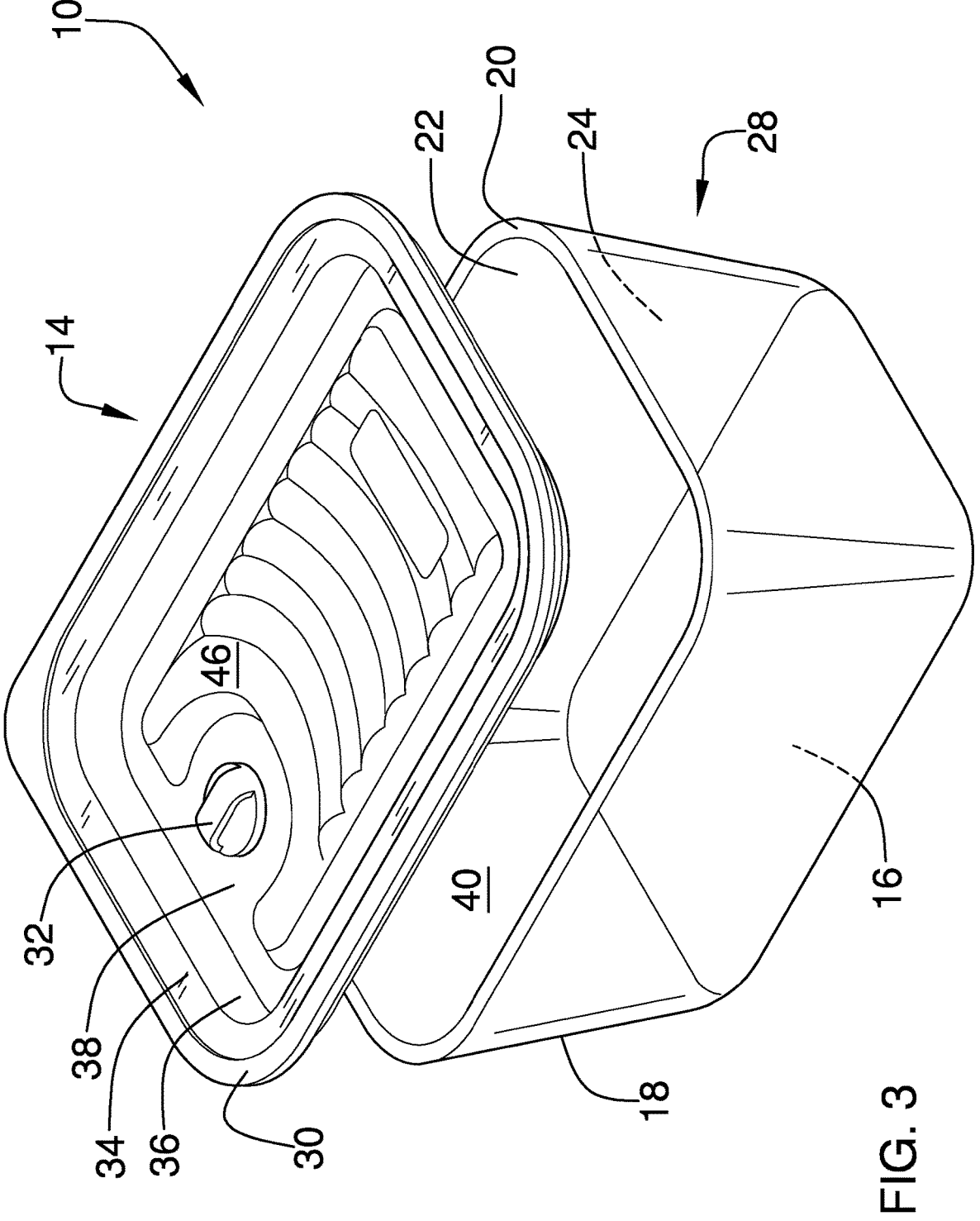
FIG. 3 is an exploded view of an embodiment of the disclosure.
Figure 4:
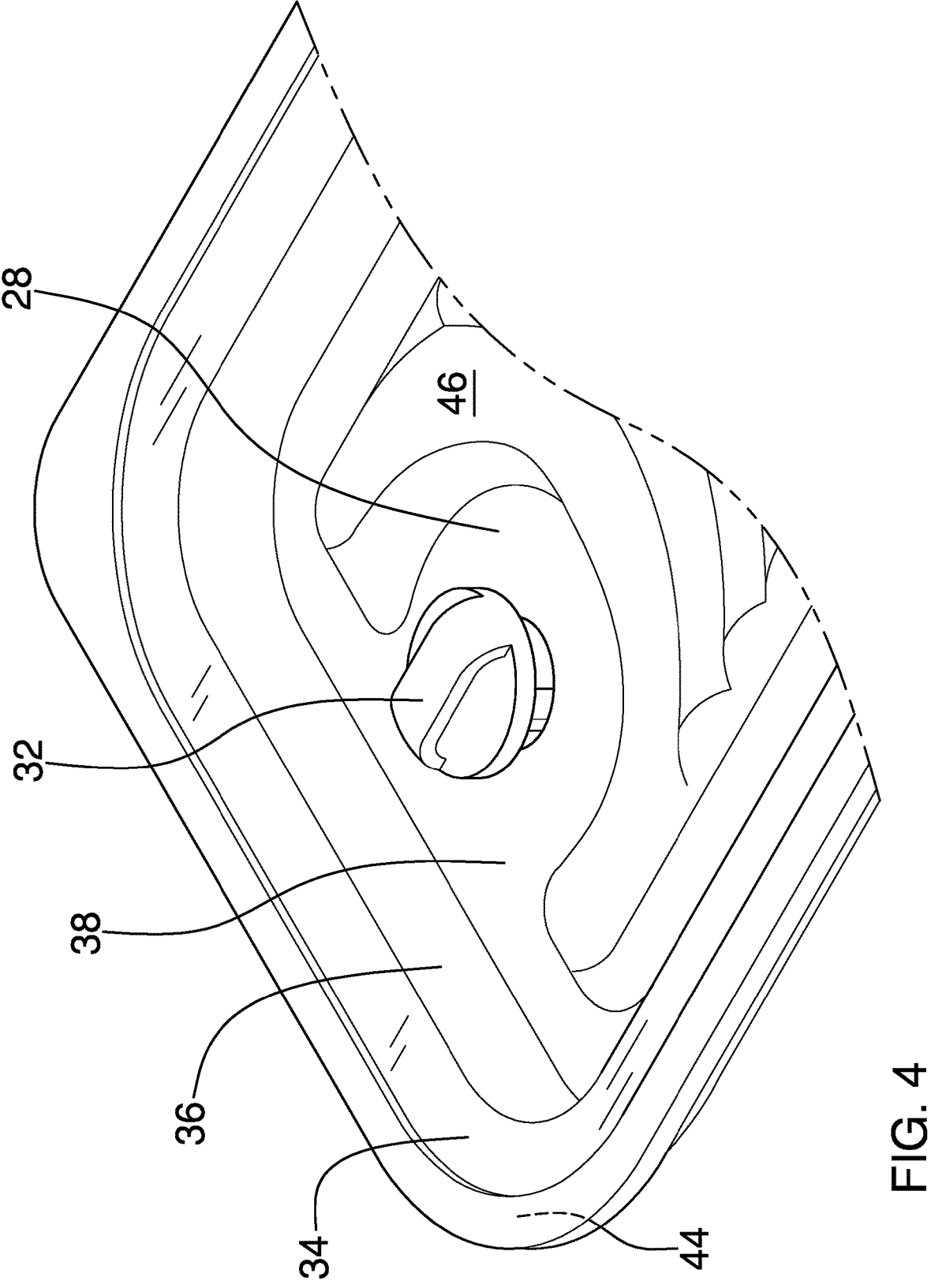
FIG. 4 is a detail view of an embodiment of the disclosure.
Figure 5:
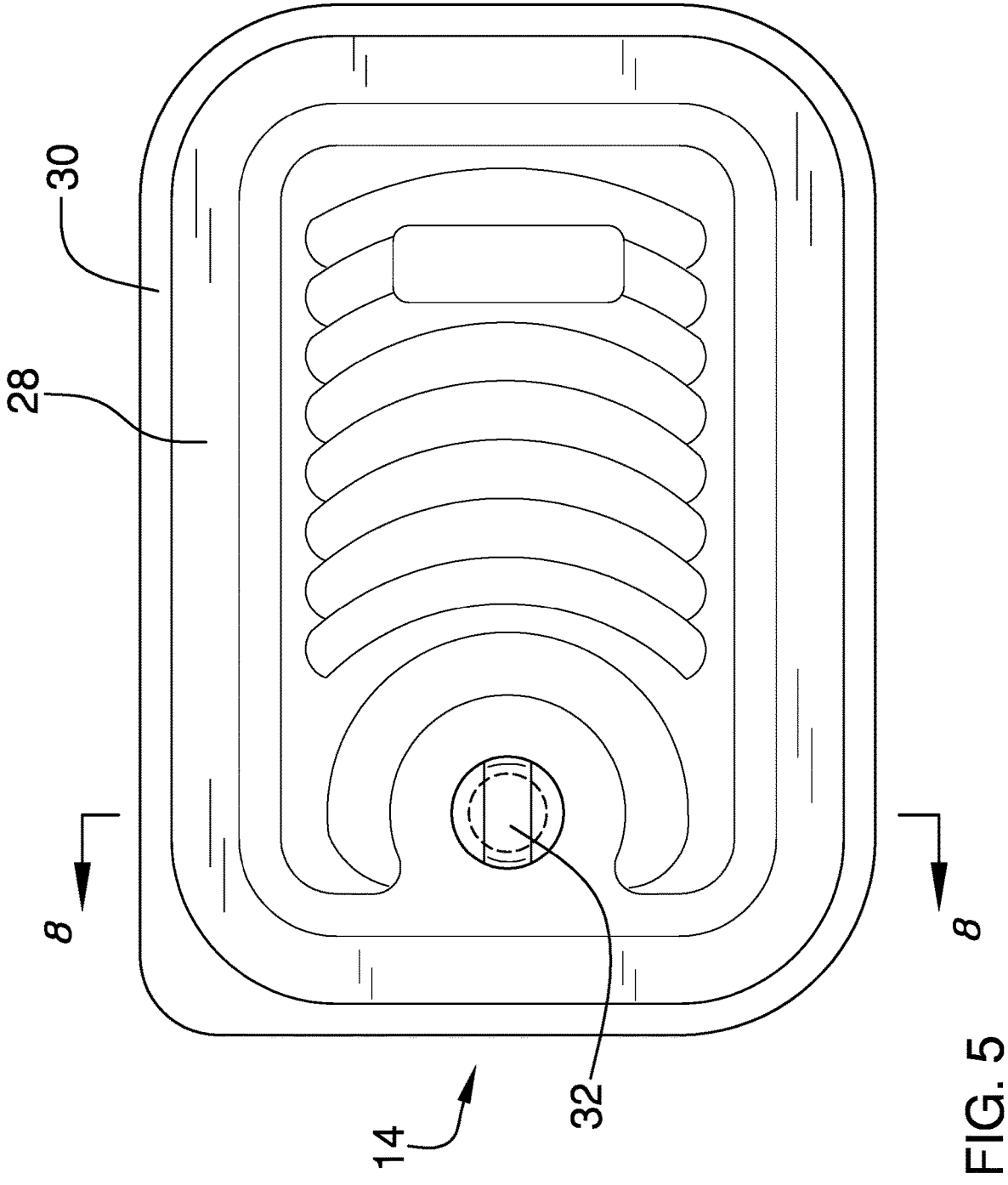
FIG. 5 is a top view of an embodiment of the disclosure.

As is shown in FIG. 3, the open top 22 of the container 12 is substantially rectangular. The present invention also anticipates containers 12 having a variety of configurations, such as, but not limited to, containers 12 with open tops 22 that are square, circular, oval, or the like, containers 12 with perimeter walls 18 extending angularly from their bottom walls 16 to their open tops 22, as is shown in FIG. 9, and containers 12 with perimeter walls 18 extending perpendicularly from their bottom walls 16.

The cover 14, which has a size that is complementarily to the open top 22, closes the open top 22 upon positioning of the cover 14 on the upper edge 20 of the perimeter wall 18. The cover 14 comprises a metal plate 28, a gasket 30, and a valve 32. The metal plate 28 comprises stainless steel, which typically would be graded 304 or 316. As is shown in FIG. 9, the valve 32 is attached to and extends through the metal plate 28 and selectively allows passage of air through the metal plate 28.

The metal plate 28 may be dish shaped and thus have a peripheral lip 34, a sidewall 36, and a base panel 38, as is shown in FIGS. 1, 2, 8, and 9. The peripheral lip 34 is circumferentially complementarily to the upper edge 20 of the perimeter wall 18. The sidewall 36 is attached to and extends downwardly from the peripheral lip 34. The sidewall 36 thus is proximate to an inner surface 40 of the perimeter wall 18 when the cover 14 is positioned upon the container 12. The base panel 38 is attached to the sidewall 36 distal from the peripheral lip 34. With the metal plate 28 thus shaped, and the container 12 being one of a plurality of containers 12 of the same size and shape (not shown), the containers 12 would be selectively stackable one upon another.

Figures 6, 7:
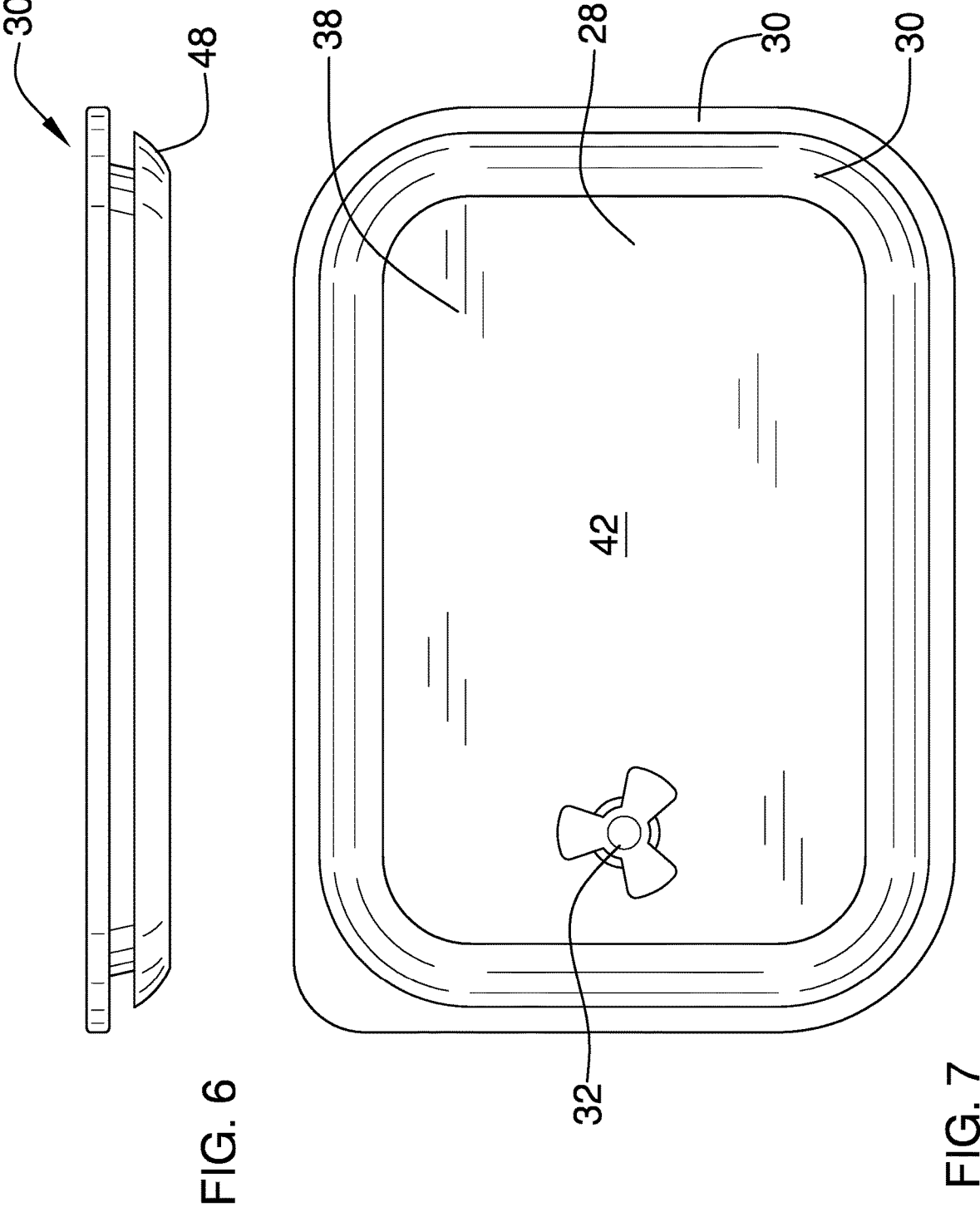
FIG. 6 is a side view of an embodiment of the disclosure.
FIG. 7 is a bottom view of an embodiment of the disclosure.
Figure 8:
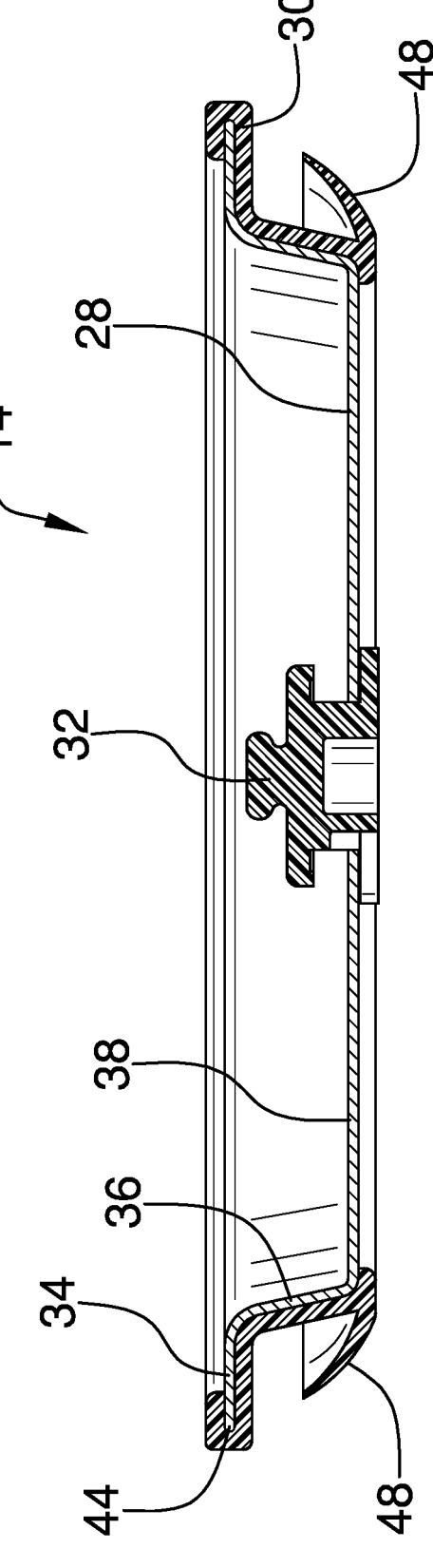
FIG. 8 is a cross-sectional view of an embodiment of the disclosure.

The gasket 30 is attached to a lower surface 42 of the metal plate 28 and extends circumferentially around the metal plate 28 proximate to its perimeter edge 44. The gasket 30 engages the perimeter wall 18 upon positioning of the cover 14 upon the container 12 to form an air-tight seal between the metal plate 28 and the perimeter wall 18. As is shown in FIGS. 6, 8, and 9, the gasket 30 is co-extensive with the perimeter edge 44 of the metal plate 28 and is attached to both the lower surface 42 and to an upper surface 46 of the metal plate 28 adjacent to the perimeter edge 44. FIGS. 8 and 9 also show the gasket 30 being co-extensive with the peripheral lip 34 and the sidewall 36 of the metal plate 28.

Figure 2:
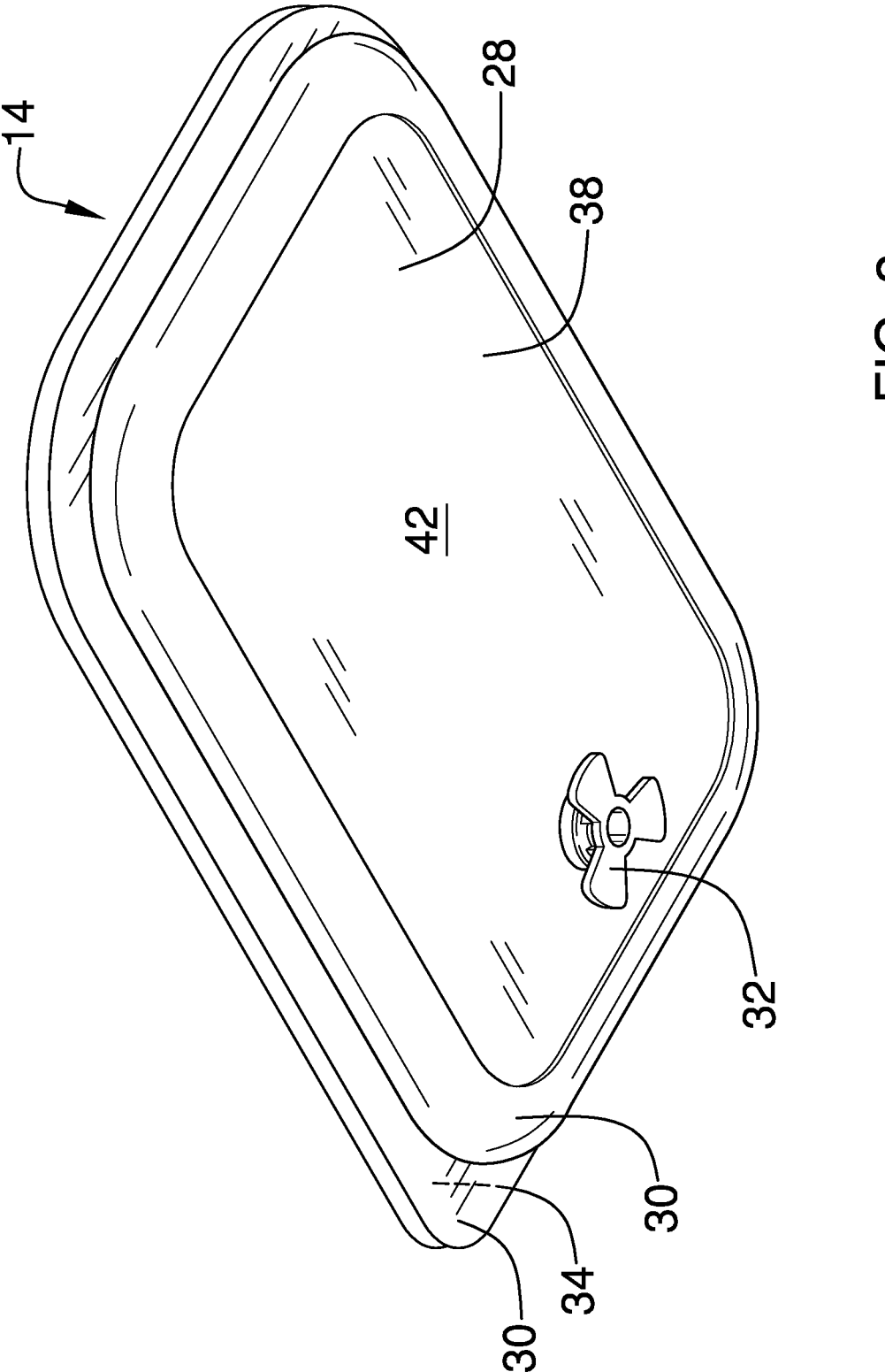
FIG. 2 is a bottom isometric perspective view of an embodiment of the disclosure.

As is shown in FIGS. 2, 6, and 8, the gasket 30 also includes a protruding section 48, which extends circumferentially around the base panel 38 and arcuately and upwardly from the base panel 38 toward the peripheral lip 34. The protruding section 48 of the gasket 30 thus sealingly engages the inner surface 40 of the perimeter wall 18 as the cover 14 is positioned upon the container 12, as is shown in FIG. 9.

The gasket 30, in one embodiment, comprises silicone and typically would be adhesively attached to the metal plate 28. The method of attachment of the gasket 30 to the metal plate 28 incorporates a multi-step process whereby after the metal plate 28 is formed, it is covered with shielding such that only a periphery of its upper surface 46 and lower surface 42 are exposed. The exposed areas, not shielded and usually at least including the peripheral lip 34 and an outer surface (the lower surface 42 facing the container 12) of the sidewall 36, are sprayed with a fine coating of silicone adhesive. The lower surface 42 of the base panel 38, adjacent to the sidewall 36, may also be coated with the adhesive such that the adhesive extends away from the sidewall 36 and onto the base panel 38 a distance typically less than 1.0 cm. The layer of adhesive coating is extremely thin and will normally have a thickness of less than 1.0 mm. One suitable adhesive is Kanglibang CL-24S manufactured and sold by Shenzhen Klanglibang Science & Technology Co. LTD located at H Building, 3$^{rd}$ Xinwei Industrial Park, Dalang Street, Longua New District, Shenzhen City, Guangdong Province, China.

Once the adhesive has been applied, the metal plate 28 is placed within a gasket mold 70 having an upper half 72 and a bottom half 74 such that the metal plate 28 is held within a cavity between the upper 72 and bottom 74 halves. One or more intermediate panels 76 may be positioned between the upper 72 and bottom 74 halves to create the unique shape of the gasket 30 as further described herein. An interior surface of the cavity abuts the upper 46 and lower 42 surfaces of the base metal plate 28 so that only the areas coated with adhesive, i.e. the peripheral lip 34, outer surface of the sidewall 36, and base panel 38 adjacent to the sidewall 36, are exposed. That is, only the areas of the metal plate 28 which will be attached to the gasket 30 are exposed within an open area 78 extending around the exposed portions of the metal plate 28. This open area 78 of the cavity has a defined shape formed by the upper 72 and bottom 74 halves as well as any intermediate panels 76. Once the metal plate 28 is enclosed within the gasket mold 70, a quantity of silicone material 80 is injected into the open area 78. This may be accomplished by placing the silicone material 80 within a depression 82 in the upper half 72 of the mold cavity 70, wherein the depression 82 includes drain holes 84 fluidly connecting the open area 78 with the depression 82. Heat and pressure are applied to the silicone material 80 causing it flow through the drain holes 84 and filling the open area 78. The heat and pressure activate the adhesive such that as the silicone material 80 cools and solidifies, it is bonded to the metal plate 28. The mold 70 is then opened and the now completed cover 14, which includes the metal plate 28 and gasket 30, is removed from the mold. The gasket 30, in its solidified state, will retain the shape of the open area 78 and will form an airtight connection completely around the metal plate 28.

The valve 32 is configured to fluidly couple a vacuum generator (not shown) to the interior space 24 to generate a partial pressure within the container 12, thereby sealingly engaging the gasket 30 to the perimeter wall 18. The protruding section 48 of the gasket 30 extending arcuately and upwardly from the panel facilitates its insertion into the container 12 and formation of a tight seal between the gasket 30 and the perimeter wall 18. The protruding section 48 of the gasket 30 sealably engaging the inner surface 40 of the perimeter wall 18, in combination with the gasket 30 sealably engaging the upper edge 20 of the perimeter wall 18, doubly seals the cover 14 to the container 12.

The valve 32, in an open configuration as is shown in FIG. 8, is configured to selectively engage the vacuum generator to generate the partial pressure within the container 12, resulting in the gasket 30 sealably engaging the perimeter wall 18. Such valves 32 are well known to those skilled in the art of self-closing valves 32 for covers 14 of vacuum containers and are typically compatible with one or more of a hand pump, a battery powered pump, and a connector engaged to a vacuum pump. The valve 32 also is configured to close, as is shown in FIG. 9, upon the partial pressure reaching a preset value, thereby maintaining the partial pressure to preserve the food 26.

In use, the vacuum container assembly 10 enables a method of storing food 50, which comprises a first step 52 of adding food 26 to a container 12 of a vacuum container assembly 10. A second step 54 of the method 50 is positioning a cover 14 of the vacuum container assembly 10 upon the container 12 so that a gasket 30 attached to a lower surface 42 of a metal plate 28 of the cover 14 engages a perimeter wall 18 of the container 12 to form an air-tight seal between the metal plate 28 and the perimeter wall 18.

A third step 56 of the method 50 is positioning a vacuum generator over a valve 32, which is attached to and which extends through the metal plate 28. A fourth step 58 of the method 50 is actuating the vacuum generator to generate a partial pressure within the container 12, whereupon the gasket 30 sealingly engages the perimeter wall 18. A fifth step 60 of the method 50 is allowing the valve 32 to close upon the partial pressure reaching a preset value to maintain the partial pressure and to preserve the food 26.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vacuum container assembly comprising:
    a container comprising glass material having a bottom wall and a perimeter wall attached to and extending upwardly from the bottom wall, the perimeter wall having an upper edge defining an open top, wherein the container has an interior space bounded by the perimeter wall that is configured for receiving food;
    a cover having a size being complementarily to the open top such that the open top is closed when the cover is positioned on the upper edge of the perimeter wall, the cover comprising:
        a metal plate;
        a gasket being attached to a lower surface of the metal plate and extending circumferentially around the metal plate proximate to a perimeter edge of the metal plate, the gasket engaging the perimeter wall upon positioning of the cover upon the container to form an air-tight seal between the metal plate and the perimeter wall, the gasket being co-extensive with the perimeter edge of the metal plate and being attached to both the lower surface and to an upper surface of the metal plate adjacent to the perimeter edge, whereupon the gasket sealingly engages the upper edge of the perimeter wall when the partial pressure is generated within the container; and
        a valve being attached to and extending through the metal plate to selectively allow passage of air through the metal plate wherein the valve is configured to fluidly couple a vacuum generator to the interior space to generate a partial pressure within the container such that the gasket sealingly engages the perimeter wall; and
    wherein the metal plate is dish shaped, such that the metal plate comprises:
        a peripheral lip, the peripheral lip being circumferentially complementarily to the upper edge of the perimeter wall, the gasket being co-extensive with the peripheral lip;
        a sidewall, the sidewall being attached to and extending downwardly from the peripheral lip, the sidewall being proximate to an inner surface of the perimeter wall when the cover is positioned upon the container, the gasket being coextensive with the sidewall; and
        a base panel, the base panel being attached to the sidewall distal from the peripheral lip.

2. The vacuum container assembly of claim 1, wherein the container comprises borosilicate glass.

3. The vacuum container assembly of claim 1, further including a protruding section of the gasket extending circumferentially around the base panel and extending arcuately and upwardly from the base panel toward the peripheral lip, such that protruding section of the gasket sealingly engages the inner surface of the perimeter wall as the cover is positioned upon the container.

4. The vacuum container assembly of claim 3, wherein the gasket comprises silicone.

5. The vacuum container assembly of claim 3, wherein the gasket is adhesively attached to the metal plate.

6. The vacuum container assembly of claim 1, wherein the metal plate comprises stainless steel.

\* \* \* \* \*